(12) United States Patent
Wang et al.

(10) Patent No.: US 7,576,982 B2
(45) Date of Patent: Aug. 18, 2009

(54) PORTABLE ELECTRONIC APPARATUS CAPABLE OF REVERSING A SCREEN

(75) Inventors: Wen-Hong Wang, Taipei (TW); Sheng-Hong Wang, Taipei (TW)

(73) Assignee: ASUSTeK Computer Inc., Peitou, Taipei (TW)

( * ) Notice: Subject to any disclaimer, the term of this patent is extended or adjusted under 35 U.S.C. 154(b) by 123 days.

(21) Appl. No.: 11/475,976

(22) Filed: Jun. 28, 2006

(65) Prior Publication Data

US 2007/0000161 A1    Jan. 4, 2007

Related U.S. Application Data

(60) Provisional application No. 60/595,389, filed on Jun. 29, 2005.

(51) Int. Cl.
*G06F 1/16* (2006.01)
(52) U.S. Cl. .................. 361/681; 345/204; 455/90; 379/443.01
(58) Field of Classification Search .............. 345/204, 345/1.1, 158; 379/443.01, 443.03, 443.11; 455/90, 556–567; 361/679–687, 724–727
See application file for complete search history.

(56) References Cited

U.S. PATENT DOCUMENTS 6,168,249 B1    1/2001    Chien

| | | | |
|---|---|---|---|
| 6,456,491 B1 * | 9/2002 | Flannery et al. | 361/685 |
| 6,512,670 B1 | 1/2003 | Boehme | |
| 6,530,784 B1 * | 3/2003 | Yim et al. | 439/31 |
| 7,212,399 B2 * | 5/2007 | Kee et al. | 361/681 |
| 2003/0052857 A1 | 3/2003 | Pappas | |
| 2003/0193773 A1 | 10/2003 | Choi | |
| 2004/0105227 A1 * | 6/2004 | Tanimoto et al. | 361/683 |
| 2004/0164958 A1 * | 8/2004 | Park | 345/158 |
| 2005/0195559 A1 * | 9/2005 | Lu | 361/681 |

FOREIGN PATENT DOCUMENTS

| | | |
|---|---|---|
| CN | 1308271 A | 8/2001 |
| CN | 2638401 Y | 9/2004 |
| EP | 0 935 376 A2 | 8/1999 |

* cited by examiner

*Primary Examiner*—Hung V Duong
(74) *Attorney, Agent, or Firm*—Winston Hsu

(57) ABSTRACT

A portable electronic apparatus includes a host module including a first housing, a first fixing device installed on the first housing, and a host installed inside the first housing for controlling operation of the portable electronic apparatus. The portable electronic apparatus further includes a display module including a second housing, a second fixing device installed on the second housing for detachably connecting with the first fixing device in a tight fit manner, and a screen installed inside the second housing and electrically connected to the host for displaying images corresponding to image signals transmitted from the host. The portable electronic apparatus further includes a connecting component. A first end of the connecting component is connected to the first housing in a rotatable manner, and a second end of the connecting component is fixed to the second housing.

3 Claims, 7 Drawing Sheets

PORTABLE ELECTRONIC APPARATUS CAPABLE OF REVERSING A SCREEN

CROSS REFERENCE TO RELATED APPLICATIONS

This application claims the benefit of the filing date of U.S. provisional patent application No. 60/595,389, filed Jun. 29, 2005, the contents of which are hereby incorporated by reference.

BACKGROUND OF THE INVENTION

1. Field of the Invention

The present invention relates to a portable electronic apparatus capable of reversing a screen, and more particularly, to a portable electronic apparatus with a host module and a display module connected with the host module in a tight fit manner.

2. Description of the Prior Art

Notebook computers are designed in a small size and a light weight for carrying conveniently. Furthermore, in a visual aspect a notebook computer with a rotary screen capable of rotating in 180 degrees is presented to the public. A user can rotate the rotary screen in 180 degrees to present data displaying on the rotary screen to another user opposite oneself. However the conventional notebook computer with the rotary screen utilizing a center axial hinge for fixing the screen to hold an angle of inclination relative to a host has a disadvantage of the unstable hinge located in a joint. This causes problems in that it is difficult to keep the screen stabile and level and the service duration of the mechanism is reduced.

SUMMARY OF THE INVENTION

It is therefore a primary objective of the claimed invention to provide a portable electronic apparatus with a host module and a display module connected with the host module in a tight fit manner for solving the above-mentioned problem.

According to the claimed invention, a portable electronic apparatus includes a host module including a first housing, a first fixing device installed on the first housing, and a host installed inside the first housing for controlling operation of the portable electronic apparatus. The portable electronic apparatus further includes a display module including a second housing, a second fixing device installed on the second housing for detachably connecting with the first fixing device in a tight fit manner, and a screen installed inside the second housing and electrically connected to the host for displaying images corresponding to image signals transmitted from the host. The portable electronic apparatus further includes a connecting component. A first end of the connecting component is connected to the first housing in a rotatable manner, and a second end of the connecting component is fixed to the second housing.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
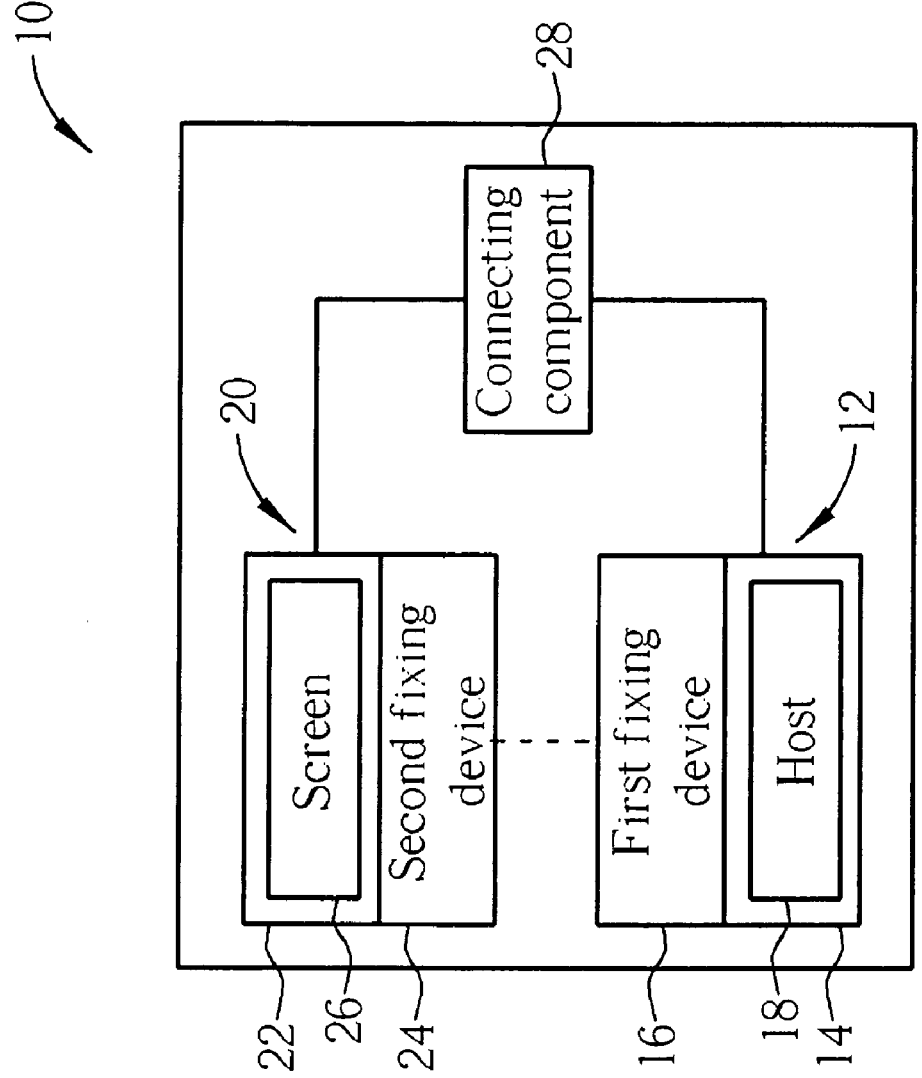
FIG. 1 is a functional block diagram of a portable electronic apparatus of the present invention.

Please refer to FIG. 1. FIG. 1 is a functional block diagram of a portable electronic apparatus 10 of the present invention. The portable electronic apparatus 10 can be a notebook computer. The portable electronic apparatus 10 includes a host module 12 including a first housing 14, a first fixing device 16 installed on the first housing 14, and a host 1 8 installed inside the first housing 14 for controlling operation of the portable electronic apparatus 10. The host 18 can be a computer host. The portable electronic apparatus 10 further includes a display module 20 including a second housing 22, a second fixing device 24 installed on the second housing 22 for detachably connecting with the first fixing device 16 in a tight fit manner, and a screen 26 installed inside the second housing 22 and electrically connected to the host 18 for displaying images corresponding to image signals transmitted from the host 18. The portable electronic apparatus 10 further includes a connecting component 28. A first end of the connecting component 28 is connected to the first housing 14 in a rotatable manner, and a second end of the connecting component 28 is fixed to the second housing 22. The connecting component 28 can be a biaxial rotary hinge.

Figure 2:
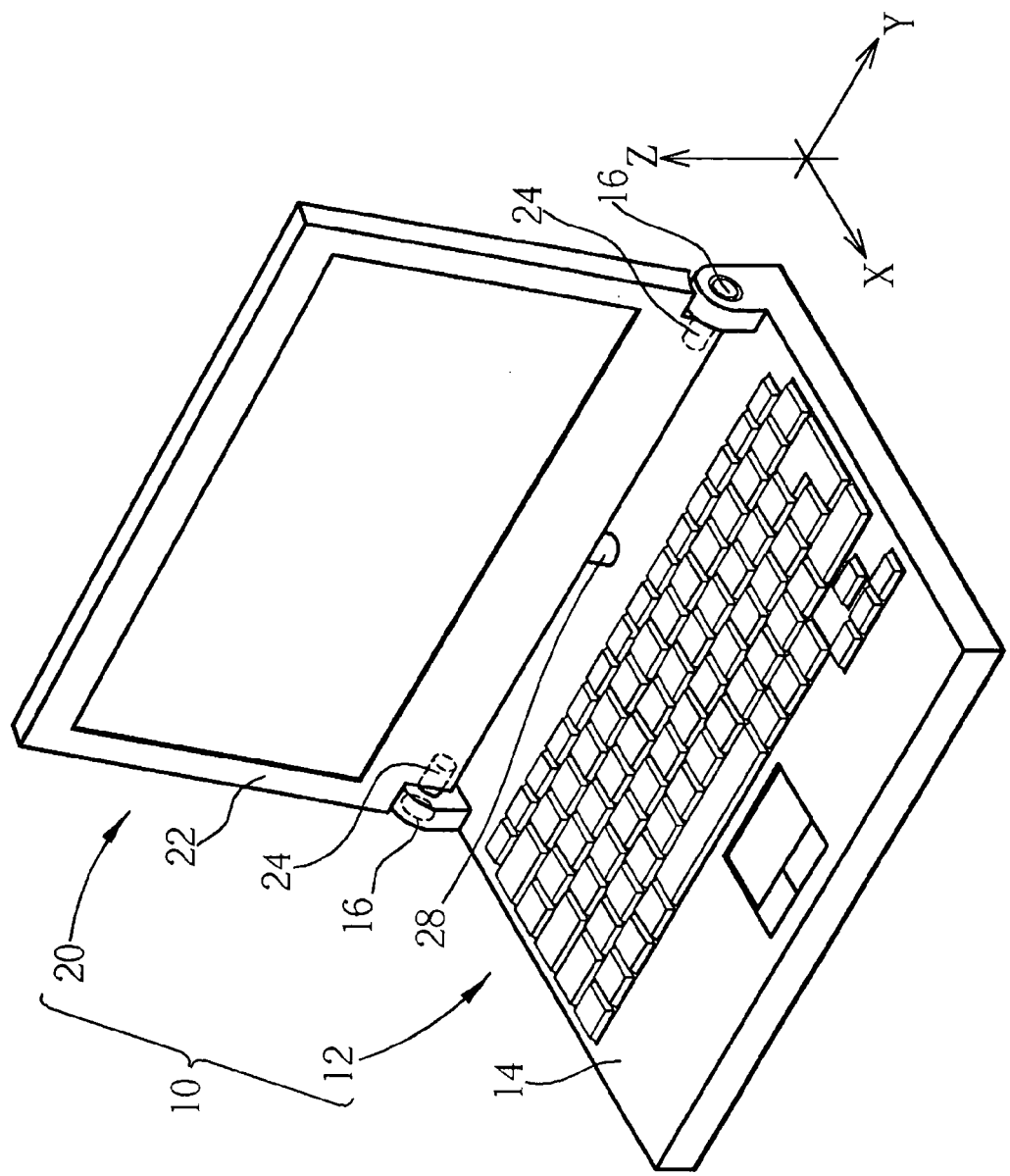
FIG. 2 is a schematic drawing of the portable electronic apparatus when a screen is not reversed according to a first embodiment of the present invention.
Figure 3:
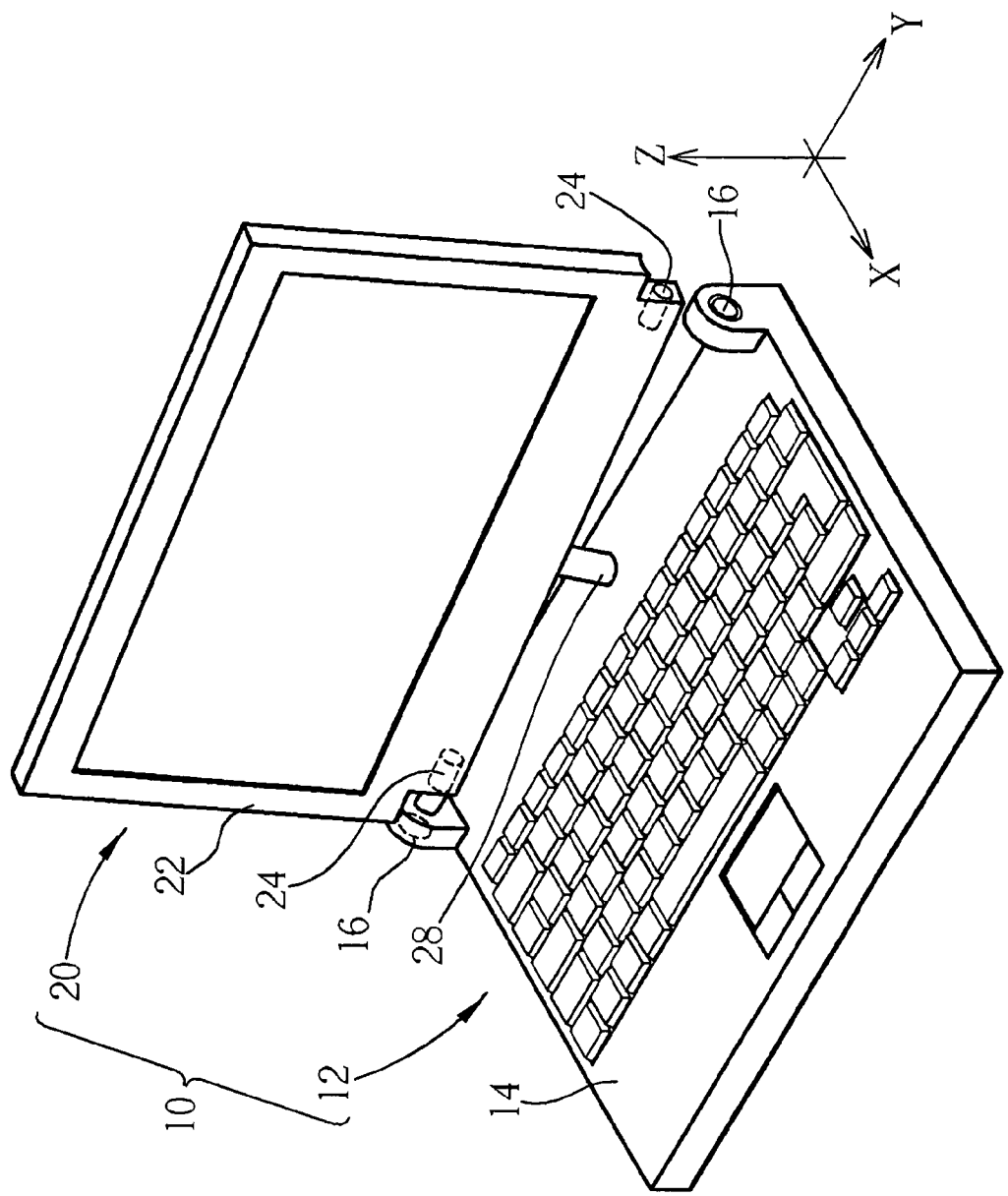
FIG. 3 is a schematic drawing of the portable electronic apparatus when the screen is reversing according to a first embodiment of the present invention.
Figure 4:
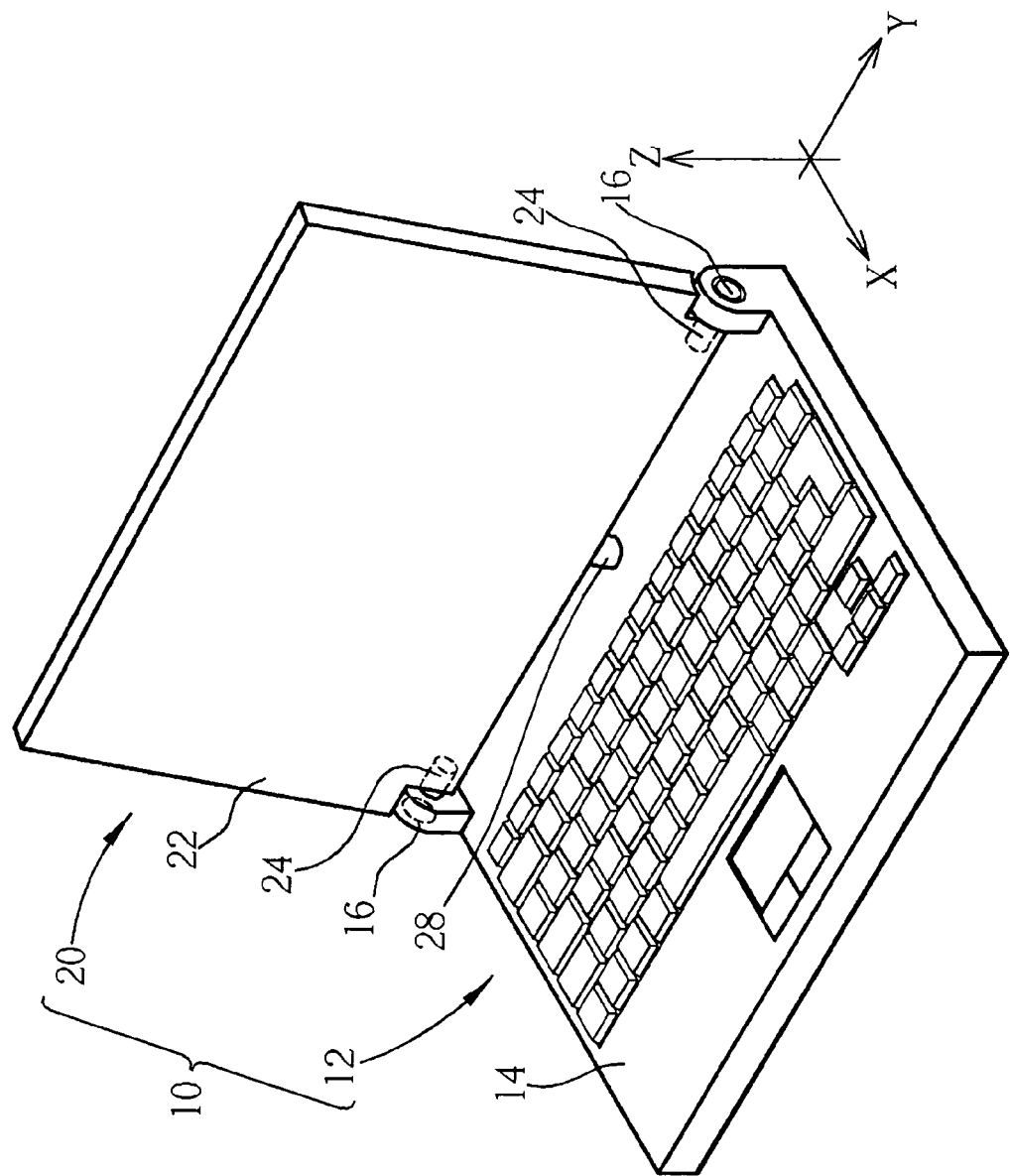
FIG. 4 is a schematic drawing of the portable electronic apparatus when the screen is reversed according to the first embodiment of the present invention.

Please refer to FIG. 2, FIG. 3, and FIG. 4. FIG. 2 is a schematic drawing of the portable electronic apparatus 10 when the screen 26 is not reversed according to a first embodiment of the present invention. FIG. 3 is a schematic drawing of the portable electronic apparatus 10 when the screen 26 is reversing according to the first embodiment of the present invention. FIG. 4 is a schematic drawing of the portable electronic apparatus 10 when the screen 26 is reversed according to the first embodiment of the present invention. The first fixing device 16 of the host module 12 is installed on both sides of the first housing 14, and the second fixing device 24 of the display module 20 is installed on both sides of the second housing 22. As shown in FIG. 2, at first the display module 20 is fixed above the host module 12 by the connection between the first fixing device 16 and the second fixing device 24 in a tight fit manner so that the display module can not rotate relative to the X axis and is not oblique. In addition, a joint of the first fixing device 16 and the second fixing device 24 can afford torque due to the tight fit connection between the first fixing device 16 and the second fixing device 24. The display module 20 can rotate relative to the Y axis for holding an angle of inclination relative to the host module 12 for different view angles. As shown in FIG. 3, when a user reverses the display module 20, the connection between the first fixing device 16 and the second fixing device 24 will be released and the display module 20 rotates relative to the Z axis by the connecting component 28. As shown in FIG. 4, when the display module 20 rotates relative to the Z axis in 180 degrees for the reverse side, the first fixing device 16 and the second fixing device 24 can be connected in the tight fit connection so that the display module 20 can hold an angle of inclination relative to the host module 12 for different view angles.

Figure 5:
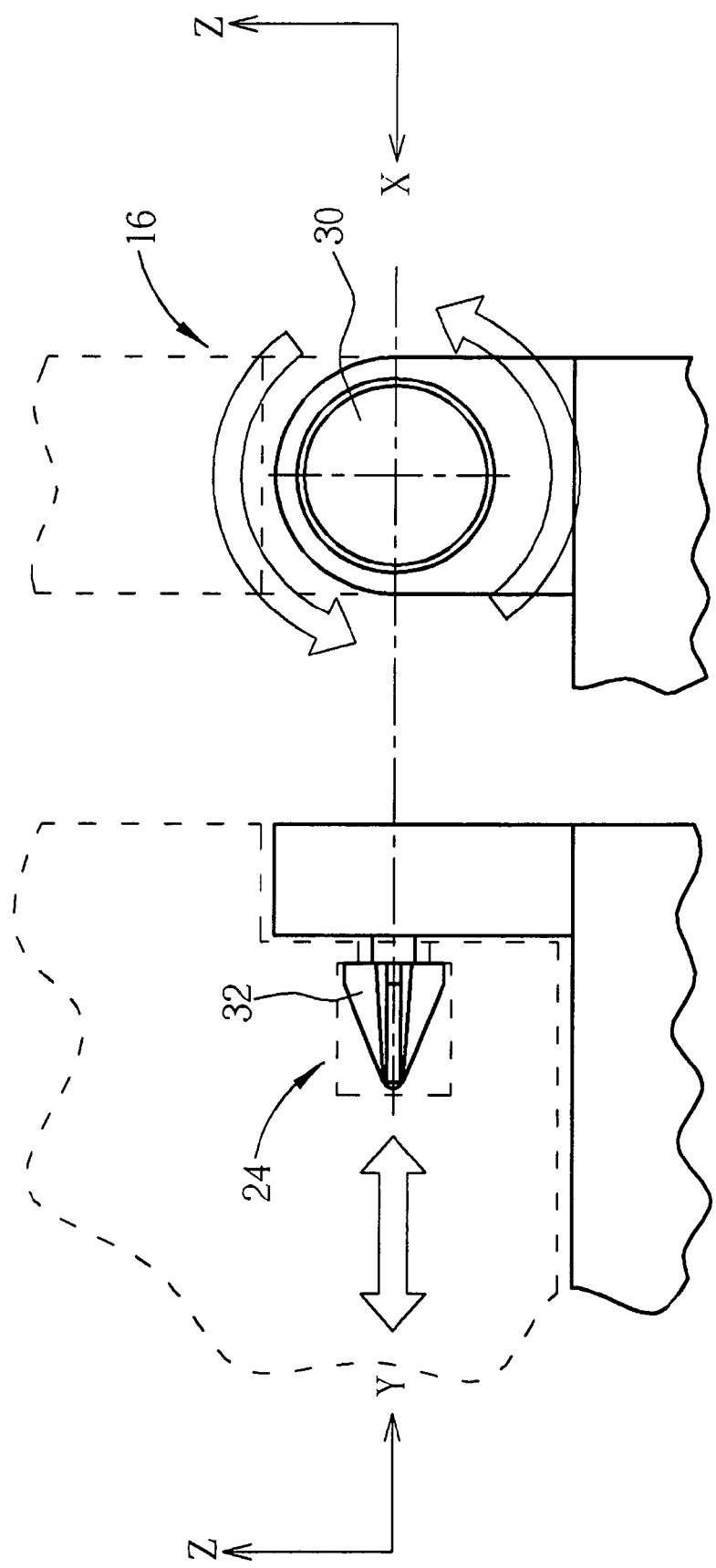
FIG. 5 is an enlarged diagram of a first fixing device and a second fixing device of the first embodiment according to the present invention.

Please refer to FIG. 5. FIG. 5 is an enlarged diagram of the first fixing device 16 and the second fixing device 24 of the first embodiment according to the present invention. The first fixing device 16 is a hinge device. The first fixing device 16 includes a pop-up mechanism 30 connected to the hinge in a telescopic manner. The pop-up mechanism 30 includes a ratchet 32. The second fixing device 24 is a notch for containing the ratchet 32 of the pop-up mechanism 30. The user can press the pop-up mechanism 30 of the first fixing device 16 so that the ratchet 32 wedges into the notch for combining the display module 20 and the host module 12 in the tight fit connection. The display module 20 can rotate relative to the host module 12 so as to adjust a view angle of the display module 20. In addition, the user can press the pop-up mechanism 30 of the first fixing device 16 again so that the ratchet 32 releases from the notch so that the display module 20 can rotate relative to the Z axis. The ratchet 32 can be in a + shape, − shape, a triangular shape, and so on.

Figure 6:
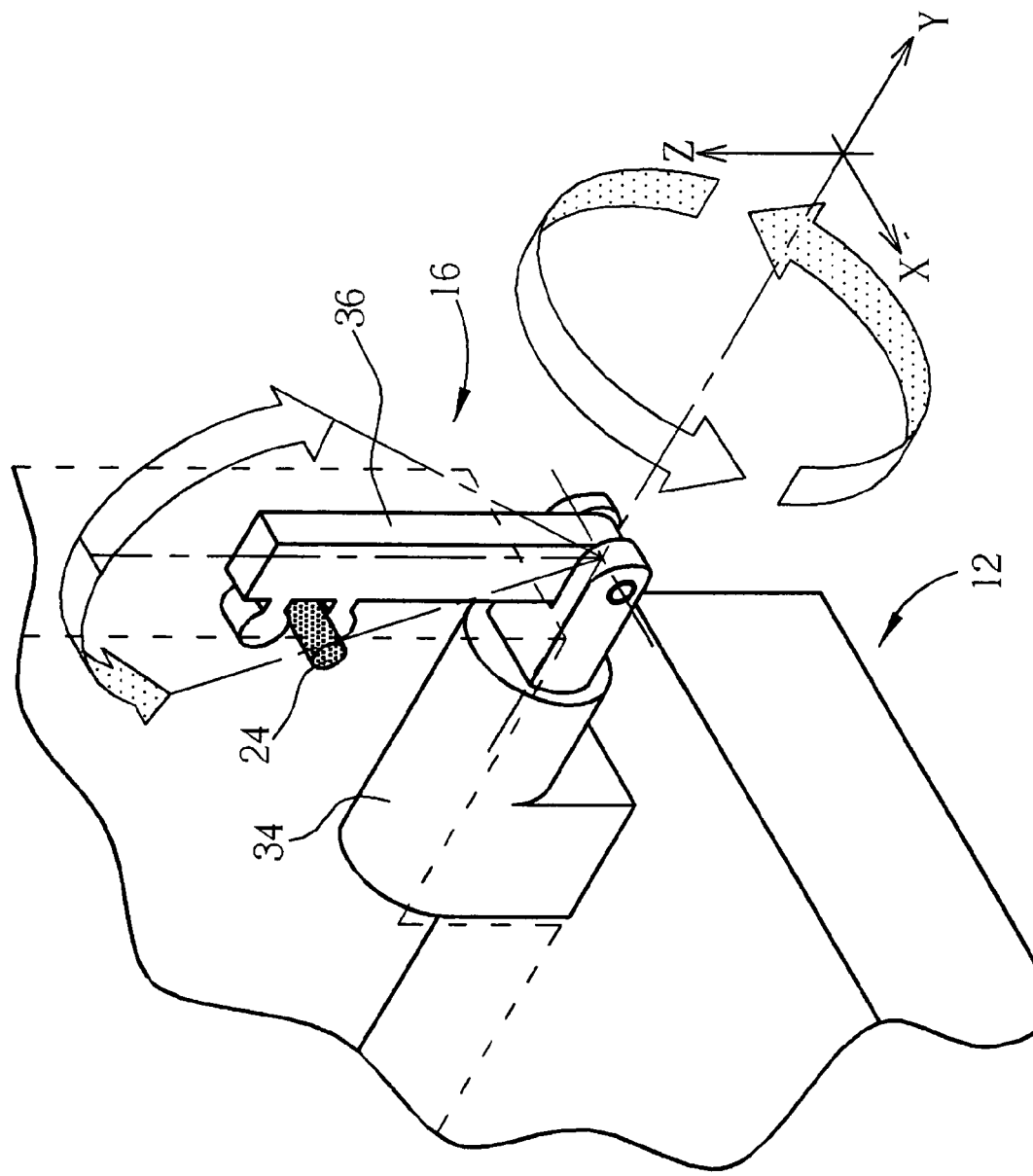
FIG. 6 is an enlarged diagram of the first fixing device and the second fixing device of a second embodiment according to the present invention.

Please refer to FIG. 6. FIG. 6 is an enlarged diagram of the first fixing device 16 and the second fixing device 24 of a second embodiment according to the present invention. The first fixing device includes a hinge 34 and a latch mechanism 36 connected to the hinge 34 in a rotatable manner relative to the X axis. The second fixing device 24 is a bar for wedging with the latch mechanism 36. The latch mechanism 36 latches the bar so that the display module 20 and the host module 12 are combined in the tight fit connection.

Figure 7:
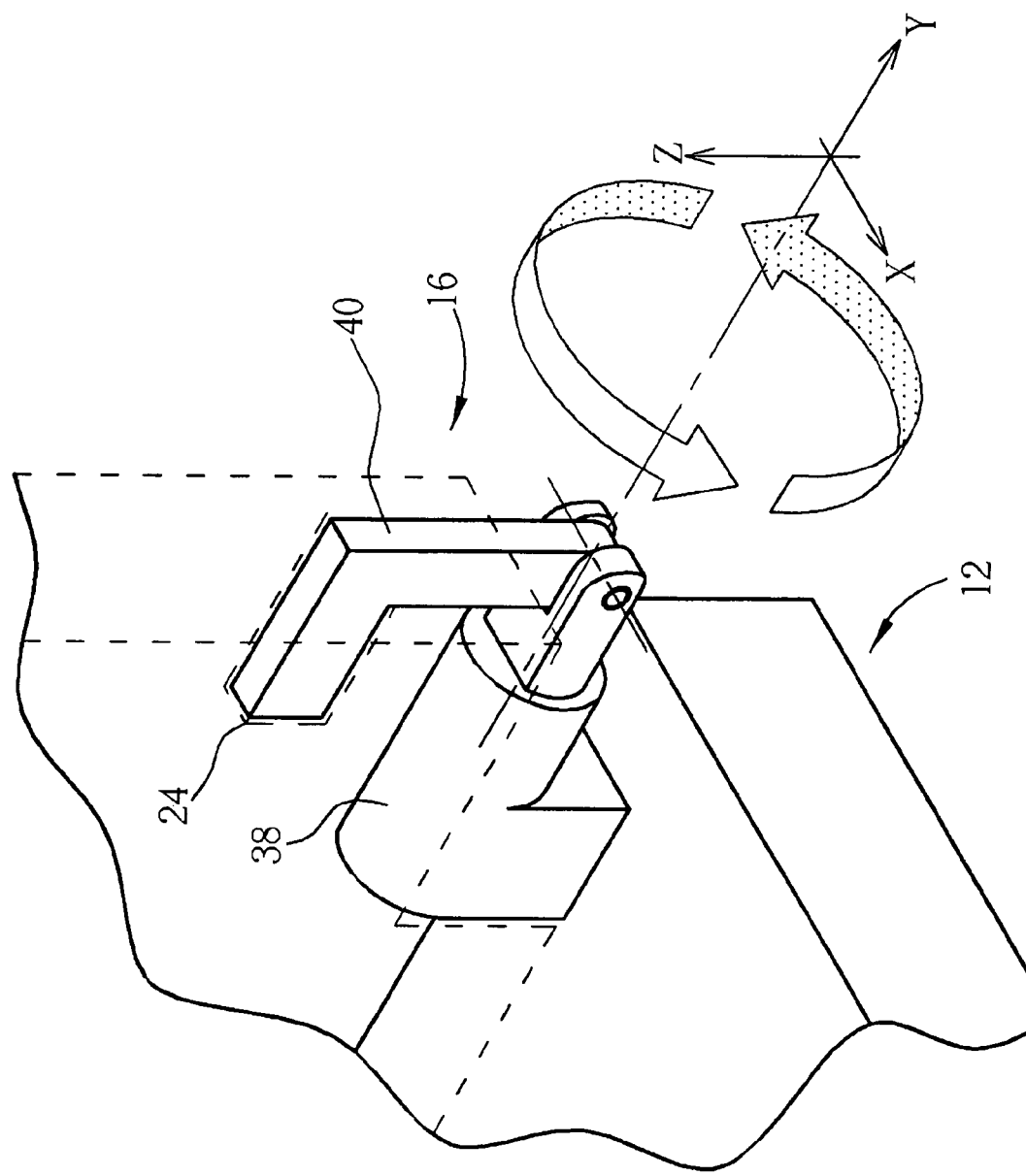
FIG. 7 is an enlarged diagram of the first fixing device and the second fixing device of a third embodiment according to the present invention.

Please refer to FIG. 7. FIG. 7 is an enlarged diagram of the first fixing device 16 and the second fixing device 24 of a third embodiment according to the present invention. The first fixing device includes a hinge 38 and a wedging structure 40 connected to the hinge 38 in a rotatable manner relative to the Y axis. The second fixing device 24 is a slot. The wedging structure 40 can be wedged in the slot so that the display module 20 and the host module 12 are combined in the tight fit connection.

In contrast with the conventional portable electronic apparatus, the display module and the host module of the portable electronic apparatus of the present invention are combined in the tight fit connection so that the joint of the display module and the host module can afford torque. The reversed screen can be held in an angle of inclination relative to the host module to adjust a view angle. The present invention improves over the problems of the conventional portable electronic apparatus with a rotary screen where it was difficult to keep the screen stable and level due to an unstable connection of the display module and the host module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable electronic apparatus comprising:
 a host module comprising:
  a first housing;
  a first fixing device installed on the first housing, the first fixing device comprising a hinge and a latch mechanism connected to the hinge in a rotatable manner; and
  a host installed inside the first housing for controlling operation of the portable electronic apparatus;
 a display module comprising:
  a second housing;
  a second fixing device installed on the second housing and comprising a bar for detachably wedging with the latch mechanism in a tight fit manner, wherein the hinge of the first fixing device fixes the second housing to hold an angle of inclination relative to the first housing; and
  a screen installed inside the second housing and electrically connected to the host for displaying images corresponding to image signals transmitted from the host; and
 a connecting component, a first end of the connecting component being connected to the first housing in a rotatable manner and a second end of the connecting component being fixed to the second housing.

2. The portable electronic apparatus of claim 1 wherein the connecting component is a biaxial rotary hinge.

3. The portable electronic apparatus of claim 1 being a notebook computer.

* * * * *